US012706237B1

(12) United States Patent
Morehouse

(10) Patent No.: US 12,706,237 B1
(45) Date of Patent: Aug. 11, 2026

(54) NESTED COIL ASSEMBLY FOR GENERATING A CONSTRAINED MAGNETIC FIELD

(71) Applicant: Mark Morehouse, Costa Mesa, CA (US)

(72) Inventor: Mark Morehouse, Costa Mesa, CA (US)

( * ) Notice: Subject to any disclaimer, the term of this patent is extended or adjusted under 35 U.S.C. 154(b) by 0 days.

(21) Appl. No.: 19/391,699

(22) Filed: Nov. 17, 2025

Related U.S. Application Data

(60) Provisional application No. 63/784,206, filed on Apr. 6, 2025, provisional application No. 63/780,436, filed on Mar. 30, 2025.

(51) Int. Cl.
*H01F 7/08* (2006.01)

(52) U.S. Cl.
CPC ....... *H01F 7/081* (2013.01); *H01F 2007/086* (2013.01)

(58) Field of Classification Search
CPC ........................... H01F 7/081; H01F 2007/086
USPC .......................................................... 335/209
See application file for complete search history.

(56) References Cited

U.S. PATENT DOCUMENTS 3,004,195 A * 10/1961 Peras ...................... H01F 7/081 335/262
4,788,024 A 11/1988 Maglich et al.
5,281,939 A * 1/1994 Juds ...................... H01H 47/02 335/266
5,528,210 A * 6/1996 Huang .................... B60L 13/04 335/297
6,550,745 B2 * 4/2003 Bergstrom ............. H01F 7/081 251/129.16
7,405,410 B2 7/2008 Morehouse
(Continued)

FOREIGN PATENT DOCUMENTS

EP 2981967 B 8/2017

OTHER PUBLICATIONS

WO 2011044495A1, "Systems and methods for magnetically assisted inertial electrostatic confinement fusion," published Apr. 14, 2011 (Klein et al.).

(Continued)

*Primary Examiner* — Shawki S Ismail
*Assistant Examiner* — Lisa N Homza
(74) *Attorney, Agent, or Firm* — Jonathan Kempf

(57) ABSTRACT

The present invention relates to a magnetic field configuration referred to as a Nested Dipole Gap Magnetic Field. The Nested Dipole Gap Magnetic Field is generated within a working gap region formed between two electromagnetic coil structures arranged to produce a coupled magnetic topology. Within the gap, a primary or main dipole magnetic field is established along a central region, while a secondary return magnetic field of opposite directional polarity is formed at larger radial distances surrounding the primary field. The secondary field encloses, confines, and stabilizes the primary magnetic field, resulting in a nested magnetic field distribution that creates a controlled spatial field boundary. This configuration enables magnetic field shaping, confinement, and isolation within a well-defined gap region, and is applicable to systems requiring controlled charged particle behavior, plasma confinement, ion acceleration regions, and electromagnetic reaction chambers.

12 Claims, 9 Drawing Sheets

(56) References Cited

U.S. PATENT DOCUMENTS

| | | | | |
|---|---|---|---|---|
| 2002/0008603 | A1* | 1/2002 | Seale | H01F 7/1844 335/266 |
| 2003/0223528 | A1 | 12/2003 | Miley et al. | |
| 2009/0085700 | A1* | 4/2009 | Lian | G01R 33/3806 335/302 |
| 2012/0187306 | A1 | 7/2012 | Klein et al. | |
| 2016/0071621 | A1 | 3/2016 | Knapp | |
| 2018/0261335 | A1 | 9/2018 | McGuire | |

OTHER PUBLICATIONS

K. Sakamoto, M. Tsuneoka, A. Kasugai, T. Imai, T. Kariya, K. Hayashi, and Y. Mitsunaka, "Major Improvement of Gyrotron Efficiency with Beam Energy Recovery," https://journals.aps.org/prl/abstract/10.1103/PhysRevLett.73.3532.

Magnetool, Inc., website, magnetoolinc.com.

https://en.wikipedia.org/wiki/Wiggler_(synchrotron).

Walker, R.P. "Wigglers and Undulators," in Proceedings of the CERN Accelerator School: Course on Synchrotron Radiation and Free-electron Lasers, edited by S. Turner, CERN, Geneva, 1996, pp. 129-190.

* cited by examiner

--PRIOR ART--

NESTED COIL ASSEMBLY FOR GENERATING A CONSTRAINED MAGNETIC FIELD

CROSS-REFERENCE TO RELATED APPLICATIONS

This application claims the benefit of, and priority to, 63/780,436, filed on Mar. 30, 2025 and 63/784,206, filed on Apr. 6, 2025, the entire specification of which is incorporated herein by reference in its entirety.

BACKGROUND

Field of the Invention

The disclosure relates to the field of magnets, and more particularly to the field of magnetic fields for magnetic confinement of charged particle beams, plasma generation, control manipulation, and particle accelerators. Specifically for the production of nuclear interactions in energetic charged particle populations.

Discussion of the State of the Art

The current art in the present field is found in the inventors' previous patents U.S. Pat. Nos. 8,138,677 and 7,825,601 and abandoned U.S. Pat. No. 7,405,410. Collectively, these references describe electromagnetic systems that generate, confine, and accelerate ionized particles using solenoidal magnetic fields, mirror-field confinement, and Hall-effect acceleration principles. The prior designs employ segmented solenoids, mirror coils, and controlled gas injection to form and manipulate high-density plasma regions for acceleration or compression, while maintaining space-charge neutrality through electron emission and magnetic field shaping.

The present invention advances this art by incorporating an enclosing coil structure that integrates the return magnetic field directly within the working region. This configuration creates a bidirectional magnetic domain—one that encompasses both polarities of the field—enabling a balanced and controllable environment for electromagnetic plasma manipulation. Such a dual-polarity working region allows improved confinement symmetry, enhanced control of particle orbits, and greater efficiency in plasma acceleration and compression than previously attainable under the prior art configurations.

BRIEF SUMMARY

The present invention provides a pair of magnetic structures held in separation to provide a working vacuum space between them wherein each of the pair of magnetic structures provide both polarities of magnetic field within the working vacuum space. The two polarities exist in a nested dipole configuration wherein the ratio and topology of the two fields are determined by the configuration of magnetic field sources, such as magnetic field coils. The separation is maintained between the two of the pair of structures by external mechanical means.

The present invention provides a vacuum space between two solenoidal type coils, sharing a common magnetic field axis. This space is called the gap. Within the gap is found both polarities of the magnetic field; a primary and a return field. Thus, the present invention allows for a smaller, more cost-effective device that achieves stable, long-duration plasma confinement.

DETAILED DESCRIPTION

Definitions

As used herein, the term "axial axis" (or "longitudinal axis") refers to the central line extending along the length of the cylindrical body. The axial axis generally defines the direction parallel to the primary geometric centerline of the cylinder, about which the cylinder is rotationally symmetric.

As used herein, the term "radial axis" refers to a line extending outwardly from the axial axis toward the outer surface of the cylinder. The radial direction is generally perpendicular to the axial axis and defines the distance from the central axis to a point on or within the cylinder.

Embodiments and Aspects

Figure 1:
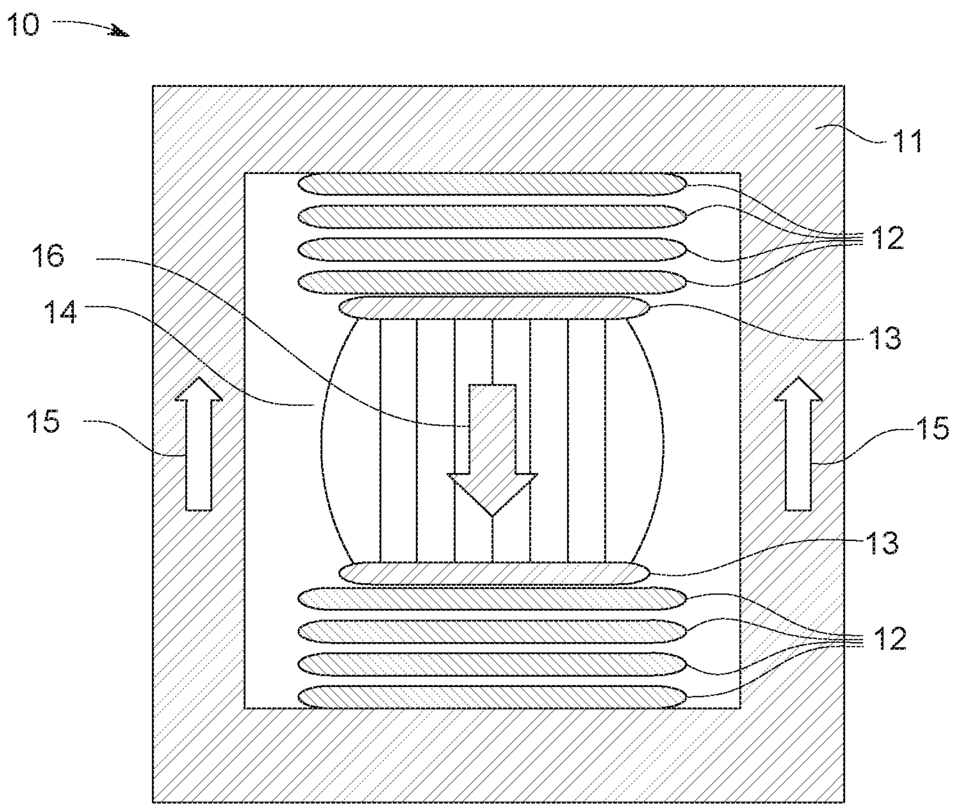
FIG. 1 is an example of the prior art.

FIG. 1 illustrates a common dipole magnetic field configuration 10 used in a wide variety of electromagnetic devices, such as a charged particle beam steering systems. A single polarity of magnetic field 16 is presented in a gap region 14 and has a south face and a north face. The lines of force of every dipole field 16 curve around the source of the field to return 15 around the outside of the field source whether electromagnet or permanent magnet. In a solenoid the field within the coil is referred to herein as "Primary" and the field that returns outside the "Return" field 15. In the prior art the return field 15 is conducted by a high permeability magnetic core 11. The field 16 is generated by electromagnetic coils 12. The working region of the dipole field 14 is present in a gap between the north pole 13 and the south pole face 13.

There are common uses of both the main and the return field of a permanent or electromagnet wherein no gap is present. Refrigerator door magnets often use a permanent magnet and a core which allows both polarities of the magnet to increase the holding force of the permanent magnet. There are also large-scale electromagnets commercially available that also use the return field, they are called electromagnetic lifting magnets. The electromagnetic windings are encased in an iron core that presents both field polarities to the pole face. In the industry they call them face magnetic fields because they make full contact with the ferrous material being lifted. For ion beam bending magnets FIG. 1 only one polarity is used, such a field is called a dipole, because it has a north face and a south face but the magnetic field between the two faces, established in the (working) gap 14 is a single polarity, the opposite polarity, the Return field, is returned through an iron core 11, it does not appear in the working gap.

Referring now to plasma confinement magnetic fields, the Tokamak fusion reactor, uses a toroidal magnetic structure, wherein the field within the poloidal coils closes around upon itself, such a closed toroidal magnetic field is considered to have no return field. In Mirror type plasma physics machines, the return field is allowed to return "at infinity" and is not a controlled part of the working confinement region. Z pinch devices also allow the field to return outside the working confinement region.

Figure 2:
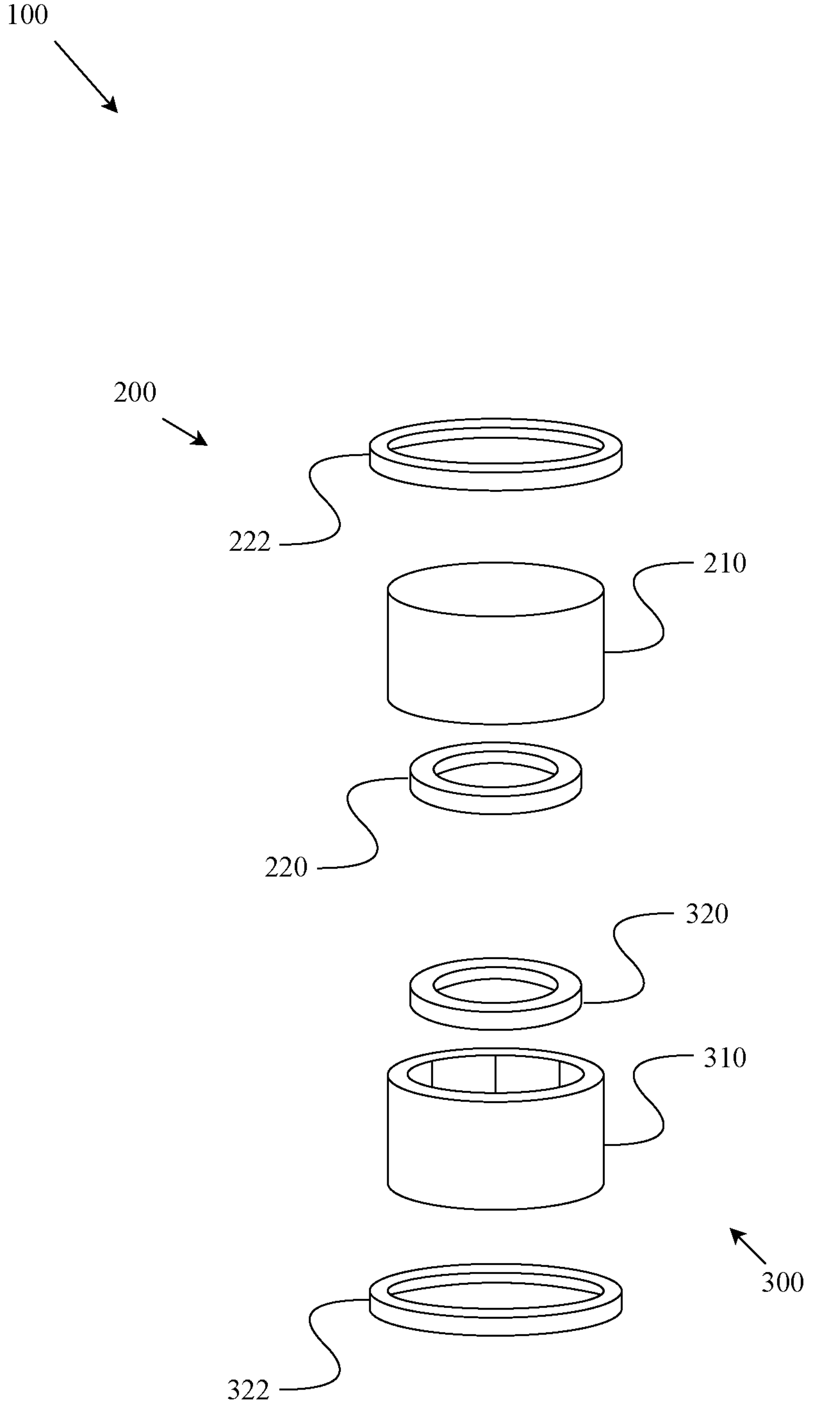
FIG. 2 shows an exploded perspective view according to one embodiment of a pair of magnetic field structures, forming the nested dipole assembly.

FIG. 2 shows an exploded view of an embodiment of the nested dipole apparatus 100. The apparatus 100 comprises a pair of magnetic structures 200 and 300. The upper magnetic structure 200 comprises a high-permeability core 210, an inner electromagnetic coil 220, and an outer coil 222. The lower magnetic structure 300 similarly comprises a high-permeability core 310, an inner electromagnetic coil 320, and an outer coil 322. The two magnetic structures 200 and 300 are arranged coaxially around a common magnetic axis.

Figure 3:
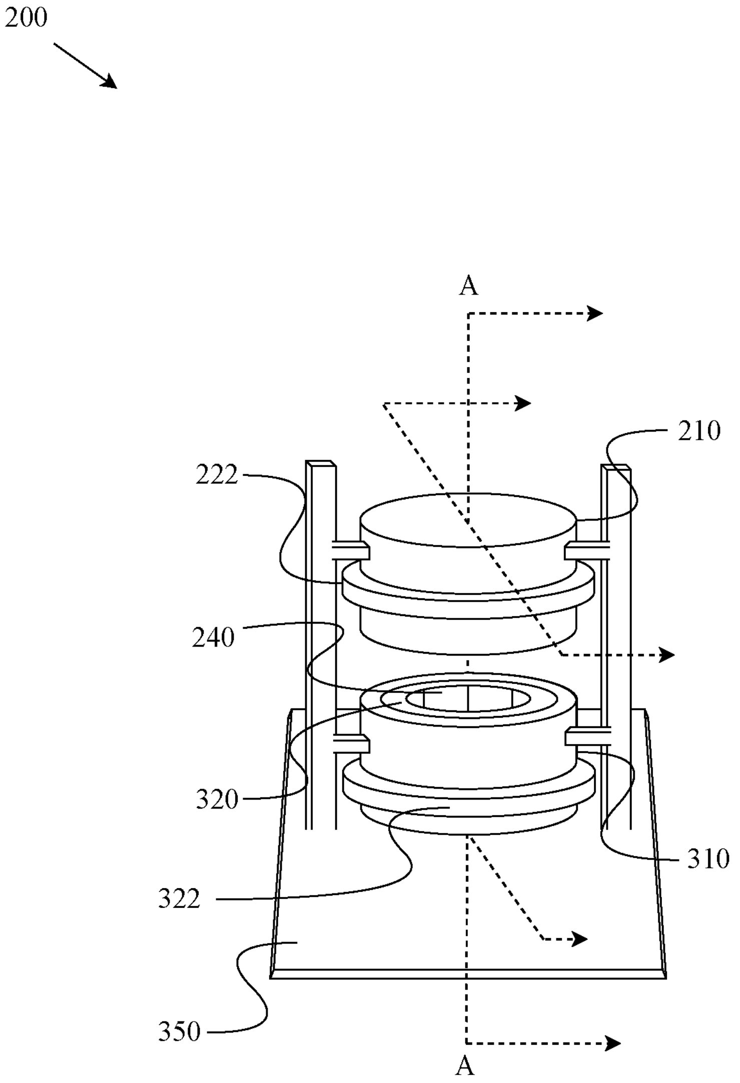
FIG. 3 shows a perspective view of the nested dipole assembly, illustrating the working gap region defined between the opposing magnetic structures.

FIG. 3 shows an embodiment of the nested dipole apparatus 100, including the pair of magnetic structures 200 and 300 in a partially assembled configuration along their common magnetic axis. In the illustrated embodiment, the facing cores 210 and 310 are positioned to define a working gap region 240 between them, within which magnetic fields are formed when the coils 222 and 322 are energized. This illustrated embodiment demonstrates the spatial relationship of the upper and lower magnetic structures.

Figure 4:
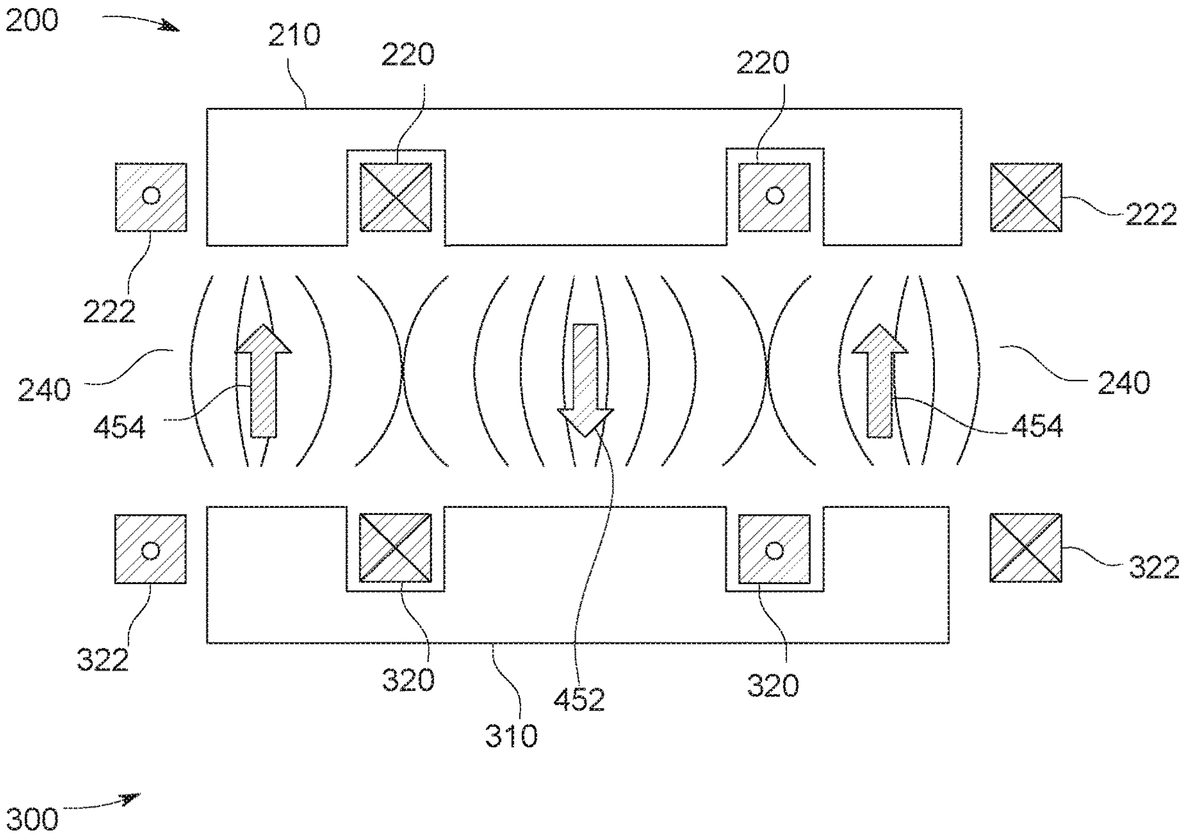
FIG. 4 shows an axial cross-sectional view taken along line A-A of FIG. 3. The figure illustrates a pair of magnetic field sources, according to a preferred embodiment with the magnetic field axis vertical.

FIG. 4 shows an example of a pair of magnetic structures (magnetic field sources) 200 and 300 of the present invention. Each of the pair of magnetic field sources comprises a high permeability magnetic core 210 and 310. The magnetic field is generated by inner coils 220 and 320. The intervening gap magnetic fields are comprised of both polarities of field 452 and 454 and establish a working region 240 for vacuum electromagnetic operations such as accelerators, colliders and storage devices.

Figure 7:
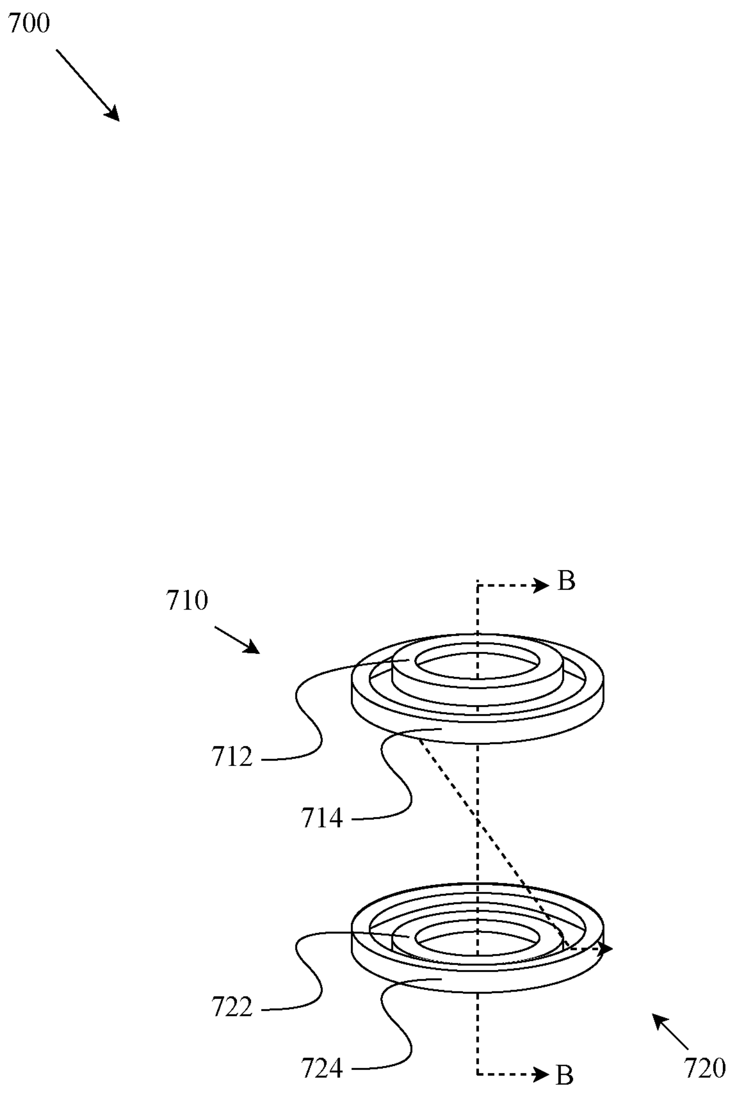
FIG. 7 shows an exploded perspective view of an alternative embodiment of the nested dipole assembly constructed without any high permeability magnetic materials.
Figure 8:
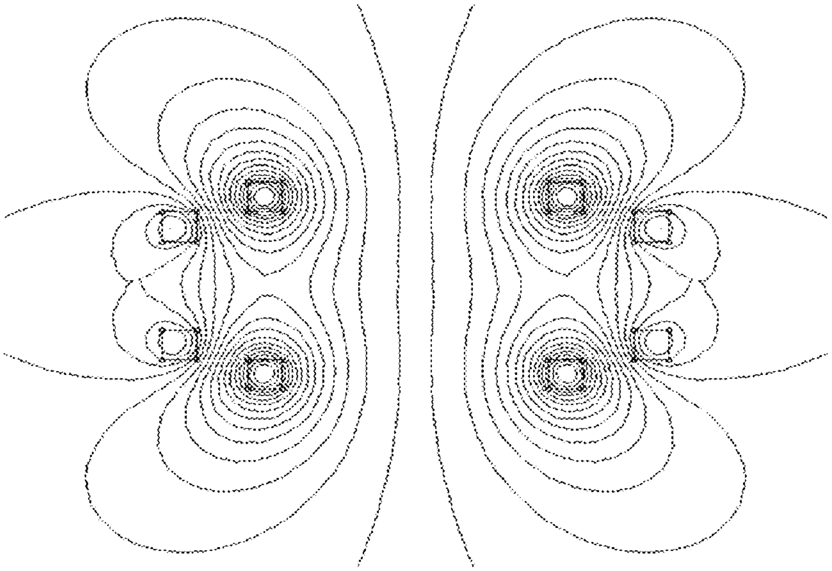
FIG. 8 shows an axial cross-sectional view taken along line B-B of FIG. 7 which illustrates a FEMM (finite element method magnetics) of a pair of coils sharing a common vertical magnetic field axis and calculated lines of force established by currents flowing in the magnetic elements without any high permeability magnetic materials.
Figure 9:
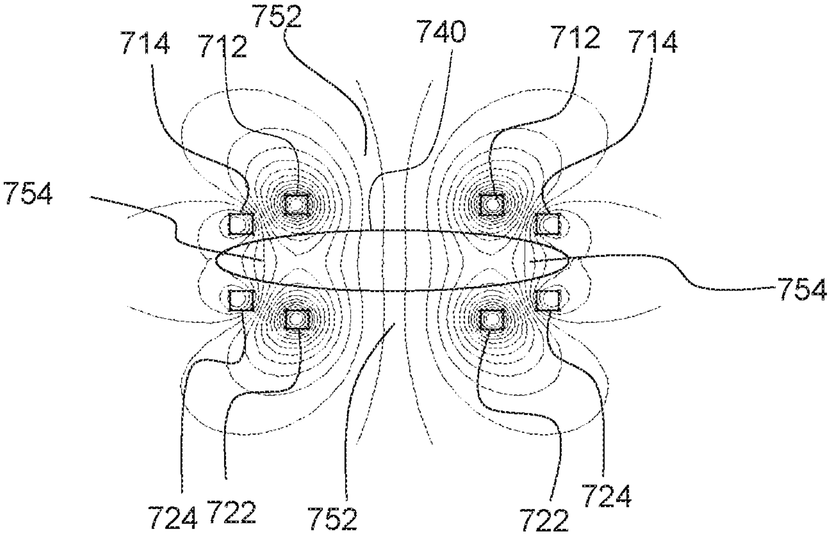
FIG. 9 shows FIG. 8 with elements numbered to correspond to the elements of FIG. 7.

The present invention introduces both polarities in the "working gap" 240 between the magnetic structures 200 (210, 220, 222) and 300 (310, 320, 322) and claims novel and beneficial use of both polarities to control charged particle motion within the gap-illustrated in more detail in FIG. 7 and FIG. 8. The unique magnetic fields 452 and 454 are characterized by a nested pair of dipoles. The inner field 452, of the nested pair is the Primary field 452 and the Return field 454 surrounds the Primary 452, producing a nested set of opposite polarity magnetic fields. As seen in FIG. 9, the nested pair 452, 454 creating a working region 240 to contain the plasma.

An additional coil or coils 222 and 322, producing magnetic field on the same axis, at a radius enclosing the working area, controls the ratio of inner 452 to outer 454 field over the respective areas of each of the polarities of the magnetic field. The additional coil or coils, called the outer coil is of such current polarity as deemed necessary to achieve the design objective.

According to various embodiments, the magnetic structures 200, 300 including the additional enclosing coils 222, 322 and iron cores 210, 310 are supported from outside the working region 240 between the magnetic structures 200, 300, as illustrated in the drawings by element 350. It is to be understood that the working region 240 where the magnetic fields are produced within the gap between the two magnetic structures 200, 300 is not to contain supporting structures 350. All supporting structures 350 must be clear of the gap 240 between magnetic structures 200, 300. All supporting structures 350 must be of such strength as to support not only the weight of the coils and iron cores, where used, but also support the magnets from movement when the magnets are energized and the full attractive magnetic energy is in the gap 240, producing immense attractive forces.

Figure 5:
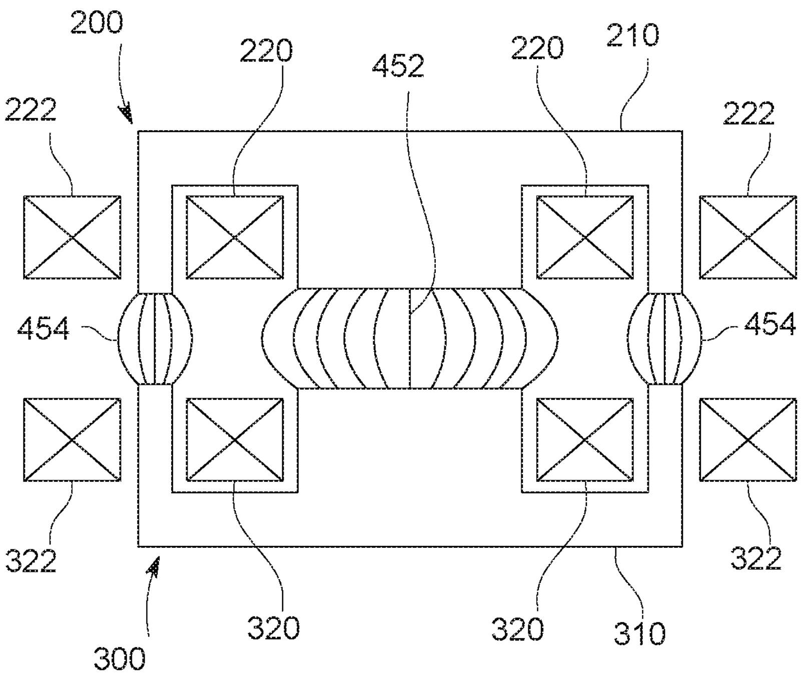
FIG. 5 shows an axial cross-sectional view taken along line A-A of FIG. 3. The figure illustrates the pair of magnetic structures.
Figure 6:
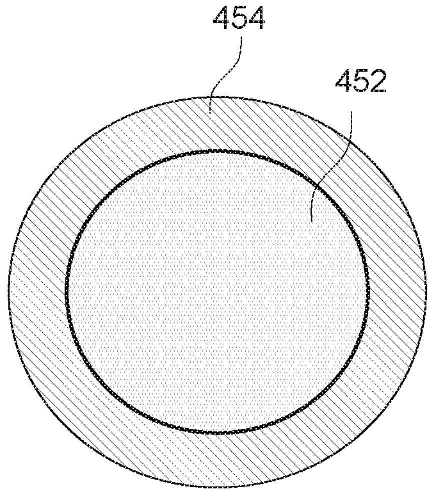
FIG. 6 shows a radial cross section (top-down) view of the magnetic field generator of FIG. 3, illustrating magnetic field vectors extending radially relative to the central axis. In the illustrated embodiment, the outer magnetic field is directed out of the plane of the drawing (toward the viewer), while the inner magnetic field is directed into the plane of the drawing (away from the viewer).

FIG. 5 shows an axial cross section of the Nested Dipole Field between the two high permeability Nested Dipole Gap Magnetic structures 200 and 300 showing the two polarities of magnetic field. The magnetic field generating coils 220 and 222 and 320 and 322, may operate with or without a high permeability magnetic core 210 and 310 and associated pole face. FIG. 6 shows the main field 452, more central, and the return field 454 enclosing the main field.

FIG. 6 shows a top down radial cross section that reveals that the return field 454 encloses the inner field 452 radially.

FIG. 7 illustrates the nested dipole apparatus in an alternative embodiment 700 constructed without a high permeability core. The apparatus 700 comprises a pair of opposing coil assemblies 710 and 720. The upper coil assembly 710 comprises an inner magnetic coil 712 and an outer coil 714. The lower coil assembly 720 similarly comprises an inner coil 722 and an outer coil 724. The two coil assemblies are arranged coaxially and separated along the magnetic field axis.

FIG. 8 and FIG. 9 further illustrate the embodiments that do not use any high permeability field shaping magnetic core material and the field exists around the coils in free space. In these embodiments, energizing the inner coils 712 and 722 and outer coils 714 and 724 generates a magnetic field topology having a central working region 740, surrounded by an inner field 752 and an outer field 754.

In the context of magnetic confinement for high-energy ion and electron beam plasmas, the magnetic field magnitudes required for effective stability and confinement are substantial. Achieving these substantial magnetic field magnitudes through resistive, normal-conducting coils is generally considered impractical due to the associated immense I2R power losses and thermal management challenges. Therefore, the required magnetic flux is typically provided or enhanced either by utilizing high permeability magnetic materials (e.g., ferromagnetic cores) to concentrate the flux and reduce the magneto-motive force requirement, or by employing superconducting coil assemblies that generate the required fields with virtually zero electrical resistance.

According to one preferred embodiment, superconducting magnetic coils may be used. Embodiments are claimed with any of the various means for producing the magnetic fields as described. Superconducting magnets require cryogenic conditions. Having an iron core shapes the magnetic field topology as seen in FIG. 6. The removal of the iron core changes the magnetic field topology as seen in FIG. 7.

According to various embodiments, the topology of the magnetic field lines can be changed by translating in the Z-axis (longitudinal) one or both of the pair of coils or magnetic structures 200, 300. The further apart the coils or magnetic structures 200, 300 are, the larger the working region 240, 740 would be in the vertical direction, i.e., the Z-axis. At some point in space, dependent on the energy levels of the coils, the magnetic fields would de-couple and destroy the working region. Consideration should also be given that the ratio of power given to the enclosing coils 222, 322 and inner coils 220, 320 can also adjust the topology 452, 454 along with the Z-axis translations.

According to another embodiment, by translating over time and in the Z-axis one of the pair of magnetic field structures as, from a large distance to a much closer distance along their common magnetic field axis towards the second of the pair of magnetic structures, a great deal of magnetic energy can be caused to undergo reconnection. A close distance between the two of the pair of Nested Dipole Gap Magnetic Field structures, is in the general range of one (1) inner coil 220 and 320, radius or diameter of separation (Helmholz coil). A much larger separation between the two of the pair of Nested Dipole Gap Magnetic Field structures results in very little coupled lines of magnetic force between the two of the pair of Nested Dipole Gap Magnetic Field structures.

According to one embodiment, the present disclosure reveals a unique magnetic structure that can be used to accelerate ions in the presence of an electric field. The utility of the present invention may introduce appropriate gases in the gap working region 240 between the magnetic structures 200, 300, applying electric fields to the working region 240 in the Nested Dipole Gap Magnetic Field 452 and 454 and controlling charged particle plasmas confined therein, as well as other uses. This new magnetic field system has not been investigated scientifically, but the novel Nested Dipole Gap Magnetic field structure can realize new and useful applications to confined plasma within the gap; such as ion and electron accelerators, pulsed power discharge devices, and gaseous electronic and gaseous ionic devices.

By providing a plasma source at the periphery and applying an electric field between the axis of the magnetic field and the plasma source a novel self-colliding ion or electron beam results, wherein the beam is trapped within the magnetic field, addressing the problem of beam trapping found in beam injection schemes of the prior art. For ions to cross the axis of a magnetic field the ion needs to pass through both polarities of field such that the canonical angular momentum is zero.

It is to be understood that the figures are presented schematically and for illustrative purposes only, and are not necessarily drawn to scale. The relative dimensions, proportions, and placement of elements, including the magnetic coils and any depicted high permeability cores, may be exaggerated, reduced, or otherwise varied for clarity and ease of understanding. No inference as to the actual size, scale, or precise dimensional ratios should be taken from the accompanying drawings. The invention is defined by the claims, and not by the specific physical dimensions or appearance of the apparatus depicted.

The magnet assemblies described herein, which establish the specific magnetic orientation for plasma capture, may utilize high permeability cores (e.g., ferromagnetic or ferrimagnetic materials) to enhance or guide the magnetic flux, or may be constructed as air core or superconducting magnet assemblies that rely solely on the current flow in the coils. The principles of the present invention, particularly the disclosed magnetic field topology, are applicable regardless of the presence, absence, or composition of such a magnetic core. Furthermore, reference to specific materials for the coils (e.g., copper, superconductors), vacuum vessel, or plasma-facing components is illustrative only, and the invention may be practiced with any suitable material or material system now known or later developed for use in plasma environments.

The operating parameters and conditions, including but not limited to plasma temperature, density, confinement time, and magnetic field strengths, are presented herein for illustrative purposes, generally representing values suitable for magnetic confinement of a high-energy plasma. The invention is not limited to a specific range of these parameters. Similarly, while the figures may illustrate a particular scale (e.g., a laboratory device or a full-scale reactor), the invention is scale-independent and is applicable to devices ranging from small research prototypes to commercial-scale fusion power plants. The disclosed magnet orientation is effective across a broad range of operational parameters and device sizes.

Although the invention has been described with reference to specific embodiments, it should be understood by those skilled in the art that various changes may be made and equivalents may be substituted for elements thereof without departing from the true spirit and scope of the invention. In addition, many modifications may be made to adapt a particular situation, material, component, manufacturing process, or process step to the objective, spirit and scope of the present invention. All such modifications and variations are intended to be included within the scope of the claims.

SUMMARY

A Nested Coil Assembly for generating a bipolar magnetic field is provided. The assembly includes a primary coil set comprising a first primary coil and a second primary coil, the first and second primary coils being axially aligned and separated by a distance. The primary coil set is configured to carry a primary current such that the magnetic fields generated by the first and second primary coils are additive along their common axis to collectively generate a primary magnetic field. Surrounding the primary coil set is a secondary coil set including a first secondary coil and a second secondary coil, the first and second secondary coils also being axially aligned and separated by a distance. The secondary coil set is disposed radially external and generally concentric to the primary coil set, and is configured to carry a secondary current having an opposite polarity relative to the primary current, thereby generating an opposing secondary magnetic field. A support structure 350 is mechanically coupled to the primary coil set and the secondary coil set in order to maintain a predetermined spatial relationship between the two coil sets. The primary coil set and the secondary coil set are axially separated from one another to define a working gap region between them, such that within this working gap region the primary magnetic field is confined and reinforced by the opposing secondary magnetic field, establishing a nested magnetic field configuration in which magnetic field gradients and intensities can be spatially managed.

The magnetic field distribution, e.g., topology, within the working gap region can be defined or adjusted based on the current and voltage configured for the primary and secondary coil sets, enabling dynamic electromagnetic control over field strength and shape. The magnetic field distribution may additionally be defined by the number of windings present in the primary and secondary coil sets, as well as by the ratio of windings between them, allowing coil construction parameters to influence the magnetic response. A wire gauge, tightness of the windings, or otherwise the cross-sectional geometry of the coil conductors may be selected to configure a specific magnetic field distribution within the working gap region, allowing conductor material and geometry to further tune magnetic performance. The magnetic field distribution can also be defined by the axial distance between the primary coil set and the secondary coil set, the radial distance between the first primary coil and the first secondary coil, the radial distance between the second primary coil and the second secondary coil, or any combination of these positional relationships, enabling the assembly's geometry to influence the electromagnetic profile.

In some configurations, a plurality of high-permeability cores is disposed along the common axis and extends through the primary and secondary coil sets. These high-permeability cores are configured to concentrate and shape the magnetic flux within the working gap region and thereby control magnetic field uniformity and field strength within the defined gap. The dimensions of each of the plurality of high-permeability cores may be selected to determine the desired magnetic field distribution within the working gap region, allowing material and shape selection to further influence field topology.

The working gap region may be maintained at a partial vacuum and charged with a controlled gas composition such that electrical discharges may be generated within the working gap region. This enables plasma confinement, ionization, controlled discharge ignition, particle trapping, or electromagnetically mediated reaction zones within the field region. The primary and secondary magnetic fields may be produced using resistive electromagnets, superconducting magnets, or permanent magnets, with or without magnetic-core materials, allowing the assembly to be implemented in a variety of electromagnetic system architectures. The supporting structure is constructed so as not to interfere with the working gap region, preventing obstruction, distortion, or unwanted field interaction within the zone of interest.

In an alternative configuration, the system includes a pair of high-permeability cores aligned along a common axis. A primary inner coil is positioned inside each core and is configured to carry a primary current that generates a primary magnetic field directed along the common axis. A secondary outer coil is wrapped around each core and is axially separated from the primary inner coil, the secondary outer coil being configured to carry a secondary current of opposite polarity relative to the primary current. A support structure 350 maintains the axial separation between the primary and secondary coil sets to define a working gap region between them. The pair of high-permeability cores provides a low-reluctance flux path that confines and intensifies the primary magnetic field within the working gap region, while the secondary magnetic field counterbalances the primary magnetic field external to the working gap region, maintaining magnetic confinement and spatial stability.

A method for generating a nested and constrained magnetic field using a high-permeability core and two axially separated coil sets includes providing a nested coil assembly comprising a high-permeability core, a primary coil set wound around the core, and a secondary coil set wound around the core and axially separated from the primary coil set to define a working gap region. A primary current is applied to the primary coil set to generate a primary magnetic field that is guided and intensified by the high-permeability core along a central axis. A secondary current of opposite polarity is applied to the secondary coil set to generate an opposing secondary magnetic field. The primary magnetic field is then constrained by using the opposing secondary magnetic field to counterbalance the primary magnetic field external to the working gap region, thereby concentrating and stabilizing the primary magnetic field within the defined working gap region.

What is claimed is:

1. An apparatus for generating a magnetic field for use in vacuum electromagnetic operations involving charged particles or plasma, comprising:

a first nested coil assembly comprising an inner coil and an outer coil, the outer coil being disposed radially external and generally concentric to the inner coil, wherein the inner coil is configured to carry a primary current generating a primary magnetic field, and the outer coil is configured to carry an independent secondary current of opposite polarity generating a return magnetic field radially enclosing the primary magnetic field;

a second nested coil assembly, coaxially aligned with the first nested coil assembly and comprising of an inner coil and an outer coil, wherein the inner coil is configured to carry a primary current generating a primary magnetic field, and the outer coil is configured to carry an independent secondary current of opposite polarity generating a return magnetic field radially enclosing the primary magnetic field;

a support structure mechanically coupled to the first nested coil assembly and the second nested coil assembly to maintain a predetermined spatial relationship along the common axis between the coil assemblies, defining a working gap region therebetween, wherein the support structure is external to the working gap region; and wherein the first nested coil assembly and the second nested coil assembly are axially separated from one another to define a working gap region therebetween, the working gap region being maintained as a vacuum space free of ferromagnetic material and configured to receive a gas or plasma therein, such that within the working gap region, the primary magnetic field is confined and enclosed radially by the opposing secondary magnetic field, establishing a nested magnetic field configuration for confinement and control of charged particles or plasma within the working gap region.

2. The apparatus of claim 1, wherein the magnetic field distribution within the working gap region is defined by the current and voltage configured for the first and second nested coil assemblies.

3. The apparatus of claim 1, wherein the magnetic field distribution within the working gap region is defined by the number of windings present in the first and second nested coil assemblies as well as the ratio of windings between the inner and outer coils.

4. The apparatus of claim 1, wherein a wire gauge or a cross-sectional geometry is selected to configure a specific magnetic field distribution within the working gap region.

5. The apparatus of claim 1, wherein the magnetic field distribution within the working gap region is defined by the axial distance between the first and secondary nested coil assemblies, the radial distance between the first inner coil and the first outer coil, the radial distance between the second inner coil and the second outer coil, or a combination thereof.

6. The apparatus of claim 1, further comprising a plurality of nested coil sets disposed along the common the plurality of nested coils designed to produce a sequence of alternating magnetic field polarities progressing radially outward from the center.

7. The apparatus of claim 6, wherein a plurality of high-permeability cores are selected to determine the desired magnetic field distribution within the working gap region.

8. The apparatus of claim 1, wherein the working gap region is maintained at a partial vacuum and charged with a controlled gas composition such that a plasma is generated and confined by the nested magnetic field configuration within the working gap region.

9. The apparatus of claim 1, wherein the primary and return magnetic fields are produced using resistive electromagnets, superconducting magnets, or permanent magnets, with or without magnetic-core materials.

10. The apparatus of claim 1, wherein the supporting structure is constructed so as not to interfere with the vacuum space of the working gap region, and is positioned entirely external to the working gap region.

11. A Nested Coil Assembly for generating a constrained magnetic field for confinement and control of charged particles or plasma in a vacuum environment, comprising:

a pair of high-permeability cores aligned along a common axis;

a primary inner coil positioned inside each core, configured to carry a primary current that generates a primary magnetic field directed along the common axis;

a secondary outer coil wrapped around each core and axially separated from the primary inner coil, configured to carry a secondary current of opposite polarity relative to the primary current to generate a secondary magnetic field surrounding the primary magnetic field;

a support structure maintaining the axial separation between the primary and secondary coil sets to define a working gap region between them, the working gap region being a vacuum space free of ferromagnetic material and configured for charged particle or plasma operations; and wherein the pair of high-permeability cores provide a low-reluctance flux path that confines and intensifies the primary magnetic field within the working gap region, and the secondary magnetic field counterbalances the primary magnetic field external to the working gap region, thereby establishing a nested dipole magnetic field configuration within the vacuum space for confinement of charged particles or plasma.

12. A method for generating alternate polarity nested magnetic fields for confinement and control of charged particles or plasma using two axially separated coil sets, the method comprising the steps of:

providing a nested coil assembly comprising, an inner coil set and an outer coil set wound and the two sets separated as to define a working gap region, the working gap region being a vacuum space free of ferromagnetic material;

applying a primary current to the primary coil set;

applying a secondary current of opposite polarity to the secondary coil set to generate an opposing secondary magnetic field; and constraining the primary magnetic field by using the opposing secondary magnetic field to counterbalance the primary magnetic field external to the working gap region, thereby concentrating and stabilizing the primary magnetic field within the defined working gap region to confine and control charged particles or plasma therein.

* * * * *